No. 788,884. PATENTED MAY 2, 1905.
F. L. BUFF.
BOW FACING OAR.
APPLICATION FILED OCT. 24, 1903.
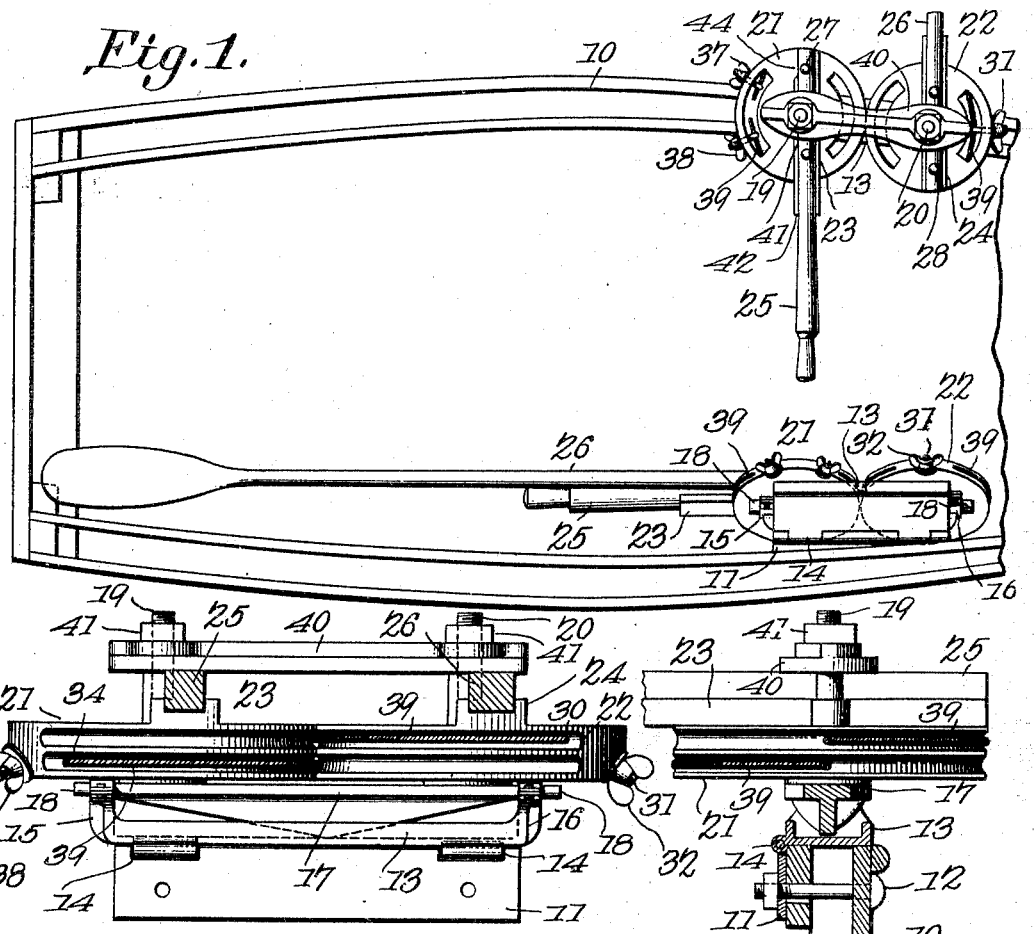
Frank L. Buff, Inventor.

No. 788,884.                                    Patented May 2, 1905.

UNITED STATES PATENT OFFICE.

FRANK L. BUFF, OF EATON, ILLINOIS.

BOW-FACING OAR.

SPECIFICATION forming part of Letters Patent No. 788,884, dated May 2, 1905.

Application filed October 24, 1903. Serial No. 178,442.

*To all whom it may concern:*

Be it known that I, FRANK L. BUFF, a citizen of the United States, residing at Eaton, in the county of Crawford and State of Illinois, have invented a new and useful Bow-Facing Oar, of which the following is a specification.

This invention relates to that class of oars and oar-locks wherein the rower sits facing the direction of motion, and has for its object to simplify and improve devices of this character and produce an oar and oar-lock wherein the two parts of the oar may be folded into close proximity with and parallel to the gunwales of the boat; and the invention consists in certain novel features of construction, as hereinafter shown and described, and specified in the claims.

In the drawings illustrative of the invention, in which corresponding parts are denoted by like designating characters, Figure 1 is a plan view of a portion of a boat with the improved device applied. Fig. 2 is a side elevation. Fig. 3 is a transverse section. Fig. 4 is a plan view, enlarged, of the improved mechanism. Fig. 5 is a sectional detail illustrating the construction of the cable-locking mechanism. Fig. 6 is an end view of the gunwale-bracket detached.

The improved device may be attached to any portion of the gunwales of any of the various forms and sizes of row-boats manufactured, but for the purpose of illustration is shown applied to an ordinary form of such a craft, 10 representing the gunwale portion of the usual construction.

The improved device comprises a vertical base-plate 11, adapted for detachable connection to the boat, as by bolts 12, and with an upper portion 13, swinging from the base portion, as by hinges 14, and adapted to rest upon the upper surface of or be folded inside of the gunwale, as required. The ends of the portion 13 are extended into bearings 15 16, having detachable caps in which a supporting-plate 17 is mounted to swing, as by trunnions 18, the plate having spaced threaded studs 19 20 extending laterally therefrom and preferably integral therewith. The studs 19 20 form bearings for disks 21 22, the latter having transverse channels formed by spaced ribs 23 24, the ribs on one side of each channel cutting centrally through the stud of its respective disk, as shown.

The oar is divided intermediately into two sections, the handle-section 25 and blade-section 26, the handle-section secured to the disk 21 between the ribs 23, as by bolts 27, and the blade-section secured to the disk 22 between the ribs 24, as by bolts 28, notches being cut in the respective sections to fit the studs 19 20. The ribs 23 24 extend radially from the margins of the disks, as shown at 42 43, and the rib 23 is cut away on one side, as at 44, to form a recess to receive one side of the projection 43 when the oar-sections are shipped, as shown at the lower side of Fig. 1, so that the oar-sections may lie closely disposed, and thus occupy the minimum amount of space when in that position, as hereinafter more fully explained. The rims of the disks 21 22 are formed with spaced circumferential cable-grooves, and the disk 22 is provided with spaced apertures 29 30 through its rim and a central aperture for a threaded clamp-hook 31, the hook provided with a wing-nut 32, by which the hooked end may be drawn into its cavity. The disk 21 is provided with spaced apertures 33 34 through its rim and with other spaced apertures between them for supporting threaded clamp-hooks 35 36, the latter having wing-nuts 37 38, by which they may be drawn into their cavities.

A section of wire cable or other suitable flexible material 39 is connected centrally to the clamp member 31 and threaded in opposite directions through the apertures 29 30, and thence conducted in opposite directions around and crossing between the disks, and thence reversely around the disk 21 and through the apertures 33 34 and into the clamp-hooks 35 36, where they are secured by setting up the wing-nuts 37 38. By this arrangement it will be obvious the cable-sections may be drawn as tightly as required and the tension "taken up" when the cable becomes loosened and lost motion thus obviated. The cables may also be very quickly renewed when worn.

The studs 19 20 above the oar-sections and disks will be connected by a brace-plate 40 and secured by the binding-nuts 41, as shown. By this arrangement when the rower sits in the boat facing the direction of motion and operates the handle-sections 25 in the same manner as with ordinary oars the blade-sections 26 will operate in the same manner as the blade ends of ordinary oars, but in reverse order to the handle-sections, so that the boat will be propelled forwardly. Then when it is desired to "ship" the oars the operator simply draws the handle-sections around toward the stern to a position parallel with the gunwale, which action will cause the blade-sections to assume a position in close proximity to the handle-sections, as shown, at the lower part of Fig. 1. This ability of the blade and handle sections to assume a position in close proximity results from the novel arrangement whereby the center of the studs 19 20 each "cuts" through one side of its respective oar-section, as above noted, whereby when the sections are folded their contiguous sides can approach close together, as shown. This is an important feature of the invention and permits the oars to be stored when not in use very close and "snug" and not be in the way of the operators or of persons moving about in the boat or entering or leaving it. They are also protected from obstructions which might be met with in using the boat or in transporting it.

The parts, except the oar-sections and cable, will be of metal, preferably of malleable iron or steel as light as consistent with the strength required, and may be readily adapted to any size or form of boat and quickly transferable from one boat to another.

Having thus described the invention, what I claim is—

1. In a device of the class described, the combination of an attaching-bracket having a member disposed to lie upon the top of the gunwale of a boat and hinged at its inner edge to the bracket and capable of being swung upwardly and inwardly beyond the gunwale to clear the top thereof, and a bow-facing-oar device carried by the hinged member and movable therewith into an unshipped position at the inner side of the gunwale and clear of the top thereof.

2. The combination of an attaching-bracket having a member hinged thereto at its inner edge and capable of lying upon the top of a gunwale of a boat, and a bow-facing-oar device mounted upon the movable member of the bracket to tilt vertically upon an axis substantially parallel with that of the movable member and also capable of being swung with the latter into an unshipped position.

3. The combination of an attaching-bracket embodying a stationary member and a movable member hinged at its inner edge to the stationary member and capable of lying upon the top of the gunwale of a boat, the opposite ends of the movable member having upstanding bearings, a member having terminal journals mounted in the bearings and provided with upstanding pivot-pins, and a bow-facing-oar device including disks rotatably mounted upon the upstanding pivot-pins, the bow-facing-oar device capable of being swung with the hinged member of the attaching-bracket to an unshipped position.

4. In a bow-facing-oar device, a pair of rotatable disks having means for the attachment of an oar-handle and an oar-blade respectively, a cable embracing the peripheral edges of the disks and crossed between the same with the ends of the cable secured to one of the disks, and means carried by the other disk and connected to an intermediate portion of the cable to take up slack therein.

5. In a bow-facing-oar device, a pair of rotatable disks having means for the attachment of an oar-handle and an oar-blade respectively, a cable embracing the peripheral edges of the disks and crossed between the same with the opposite ends of the cable secured to one of the disks, and an endwise-adjustable clamp-hook piercing the peripheral edge of the other disk with its hook embracing the cable to connect the same to the disk and to take up slack therein.

6. In a bow-facing-oar device, a pair of rotatable disks having means for the attachment of an oar-handle and an oar-blade respectively, one of the disks being provided with a passage having its opposite ends piercing the peripheral edge of the disk, a cable passed through said passage and embracing the peripheral edges of the disks, with portions crossed between said disks, the opposite ends of the cable being connected to the other disk, and a tension device piercing the peripheral edge of the first-mentioned disk with its inner end connected to the cable portion in the passage and its outer end accessible for adjustment.

7. In a bow-facing-oar device, a pair of rotatable disks having means for the attachment of an oar-handle and an oar-blade respectively, each disk being provided with a passage having its opposite ends intersecting the peripheral edge of the disk, a cable embracing the peripheral edges of the disks and crossed between the same, the middle portion of the cable lying within one of the passages and the opposite ends of the cable lying within the other passage, adjustable threaded clamp-hooks piercing the peripheral edge of the disk having the ends of the cable with the hooks connected thereto, and another screw-threaded hook piercing the peripheral edge of the other disk with its hook portion engaging the cable within the adjacent passage to take up slack in the cable.

In testimony that I claim the foregoing as my own I have hereto affixed my signature in the presence of two witnesses.

FRANK L. BUFF.

Witnesses:
C. B. COULTER,
HAMPTON S. BOGARD.